(No Model.)

F. SPLITTSTOSER.
LOCK HOOK.

No. 458,779. Patented Sept. 1, 1891.

WITNESSES:
E. D. Smith
Alx. S. Stewart

INVENTOR
Ferdinand Splittstoser,
BY Louis Feser & Co.
HIS ATTORNEYS

UNITED STATES PATENT OFFICE.

FERDINAND SPLITTSTOSER, OF NORTH BRANCH, MINNESOTA.

LOCK-HOOK.

SPECIFICATION forming part of Letters Patent No. 458,779, dated September 1, 1891.

Application filed January 10, 1891. Serial No. 377,375. (No model.)

*To all whom it may concern:*

Be it known that I, FERDINAND SPLITTSTOSER, of North Branch, in the county of Chisago and State of Minnesota, have invented certain new and useful Improvements in Lock-Hooks; and I do hereby declare the following to be a full, clear, and exact description of the same, reference being had to the accompanying drawings, forming a part of this specification, and to the letters of reference marked thereon.

This invention relates to that class of hooks having a locking-tongue for preventing the escape of the link, ring, or other member with which the hook is engaged; and the invention consists in certain novel details of construction and combinations and arrangements of parts, to be now described, and pointed out particularly in the appended claims.

Figure 1:
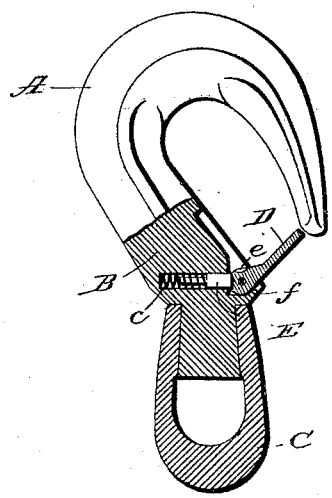
Figure 2:
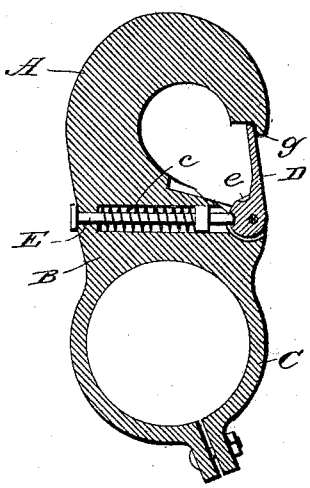
Figure 3:
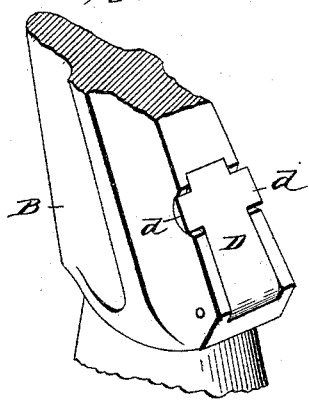

In the accompanying drawings, Figure 1 is a longitudinal section through a hook constructed in accordance with my invention. Fig. 2 is a similar view through a modified form of hook. Fig. 3 is a detail perspective of the locking-tongue.

Like letters of reference indicate the same parts in all the figures.

A indicates the body of the hook; B, the shank of the hook, and C the eye, said parts being of any ordinary construction, if desired.

The hooks shown in the drawings are particularly designed for use in connection with agricultural implements, eveners, or where poles are dispensed with, as on plows, drags, harrows, &c., that shown in Fig. 1 being provided with a swivel-eye and that shown in Fig. 2 with a clamp-eye for attachment to a singletree or similar body.

The prime object of the invention is to provide a locking-tongue which shall be simple, strong, and efficient; and to this end a tongue D is pivoted in the shank of the hook, which latter is provided with a suitable recess for the reception of the tongue, as shown, leaving an unobstructed opening. The tongue D' is preferably pivoted to swing inward and is provided with little wings $d$, projecting at each side, which may be readily grasped to move the tongue from one position to the other. Seated within the shank of the hook, in a straight cylindrical seat, is a pin E, pressed forward by the coil-spring C, and the end of which co-operates with any one of a series of depressions or recesses $e$ in the segmental or rounded base of the tongue. In Fig. 1 the spring-pin is entirely within the hook-shank, being held in its seat by the tongue itself, and the depressions are of proper depth to hold the tongue firmly, but permit it to yield when unusual pressure is brought to bear upon it. In Fig. 2 the spring-pin passes way through the shank and is provided with an enlargement or head F, which may be grasped to release the pin from engagement with the tongue when it is desired to open or close it. In this instance the recesses in the tongue are made deep enough to prevent the movement of the tongue without first disengaging the spring-pin. This form of tongue is particularly designed for use in those situations where there is likelihood of strain being brought to bear which would tend to open the tongue, as on a "neck-yoke," where the horse might rub his nose against the hook, &c. Both hooks are provided with stops for arresting the outward swing of the tongue at the proper point, that in Fig. 1 being formed by the end wall $f$ of the recess for the tongue and in Fig. 2 by the little seat $g$ on the nose or point of the hook.

Hooks constructed in accordance with the present invention are simple, inexpensive, and will be found very efficient in use.

Having thus described my invention, what I claim as new is—

1. The combination, with the hook having the straight cylindrical pin-seat in the shank transversely thereof and the pin and coil-spring within said seat, of the locking-tongue pivoted in the shank and having the series of recesses in its base for the reception of the end of the pin to hold the tongue in different positions of adjustment, substantially as described.

2. The combination, with the hook having the recess for the reception of the tongue, of the locking-tongue pivoted in said recess and having the lateral wings extending out at each side of the hook, and the spring-pressed pin arranged transversely of the shank of the hook for holding the tongue in position, substantially as described.

In testimony whereof I have hereunto set my hand in presence of two subscribing witnesses.

FERDINAND SPLITTSTOSER.

Witnesses:
P. W. FARICY,
F. F. WILDE.